Figure 1:
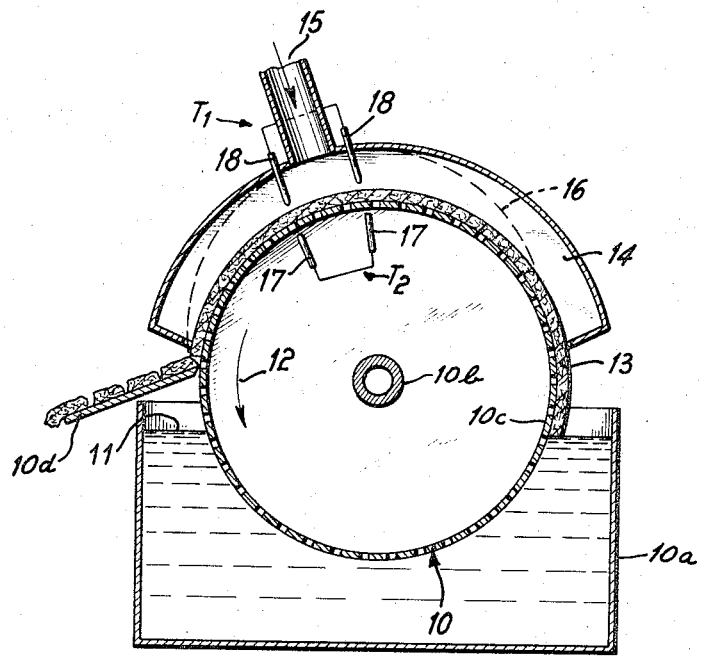

Aug. 29, 1967   R. L. VON DER GATHEN ETAL   3,338,411
METHOD FOR DEWATERING COAL SLURRIES
Filed March 22, 1965   2 Sheets-Sheet 1

INVENTORS.
RUDOLF LUDWIG VON DER GATHEN
FERDINAND PREISINGER

ATTORNEY

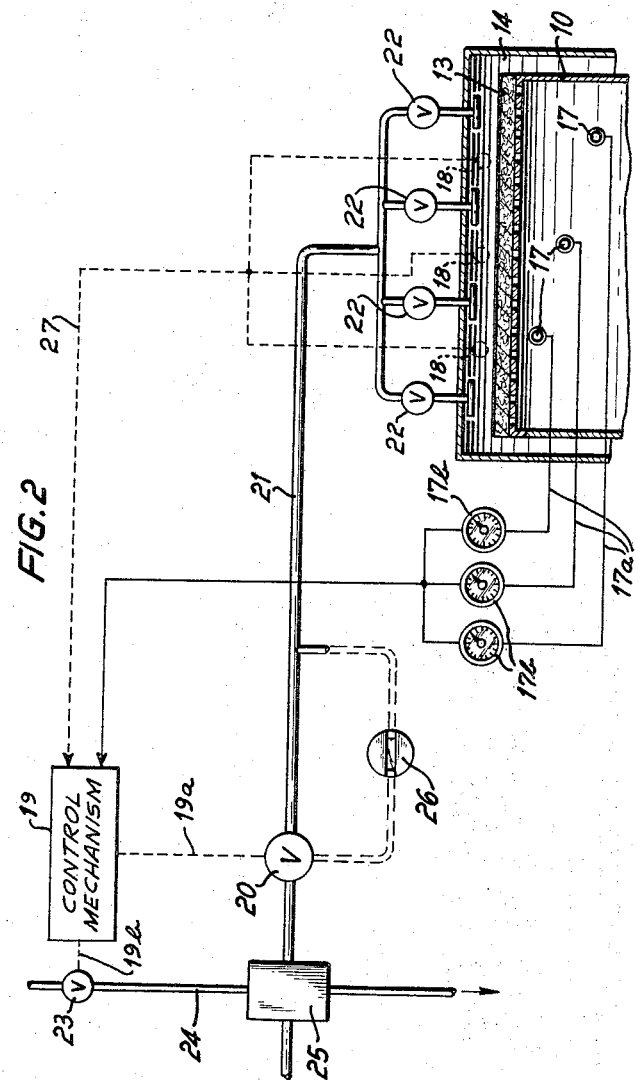

United States Patent Office 3,338,411
Patented Aug. 29, 1967

3,338,411
METHOD FOR DEWATERING COAL SLURRIES
Rudolf Ludwig von der Gathen, Dortmund, and Ferdinand Preisinger, Dortmund-Derne, Germany, assignors to Harpener Bergbau-Aktiengesellschaft, Dortmund, Germany, a corporation of Germany
Filed Mar. 22, 1965, Ser. No. 441,812
1 Claim. (Cl. 210—67)

The present invention relates to a method for reducing the water content of coal slurries which are obtained in large amounts in the upgrading of coal.

This application is a continuation-in-part of copending application Ser. No. 363,120, filed Apr. 28, 1964, and assigned to the asignee of the present application.

In accordance with the invention shown and described in the aforesaid copending application Ser. No. 363,120, dewatering of coal slurries is accomplished by means of vacuum drums or vacuum disc filters in which the filter cake is treated with steam having a predetermined temperature and predetermined pressure. Specifically, dewatering is accomplished by bringing steam into contact with a preliminarily dewatered filter cake, the steam being superheated at temperatures of 120° C. to 135° C., and the steam pressure being regulated such that the condensation point of the steam which penetrates the preliminarily dewatered filter cake is immediately adjacent the filter itself. That is, the steam will condense after passing through the filter cake and immediately before it passes through the filter element itself.

In this manner, the operating conditions may be optimized whereby the steam consumption is on the order of about 14 to 20 kilograms per metric ton and the filter cake is heated to only about 40° C. to 50° C. The proper location of the condensation point within the filter cake, that is, immediately adjacent the filter, may be established by determining the liquid content of the filter cake at the exit side. Shifting of the condensation point may be accomplished by varying the steam pressure or the temperature within predetermined limits. Further, the admission pressure of the steam is between about 1.2 and 1.5 atmospheres (i.e., 1.2 and 1.5 times absolute atmospheric pressure), and the steam pressure within the filter cake is between 0.6 and 0.9 atmosphere.

A preferred apparatus for carrying out the method described in the aforesaid copending application Ser. No. 363,120 comprises a hood which is provided with an inlet pipe, the hood being so disposed above a vacuum filter drum or vacuum filter disc that a portion of the drum outside the filter slurry is beyond the action zone of the steam, this portion being defined as a pre-dehydration zone. The pre-dehydration zone may take up approximately one-third of the filter area emerged from the filter slurry.

When operating vacuum drum filters or vacuum disc filters in accordance with the teachings of application Ser. No. 363,120, it was found that optimum temperatures and optimum pressures for the admitted steam are dependent on the grain structure and the solid content of the filter cake substance. These properties of the filter cake determine to a decisive extent the thickness of the filter cake, and the degree of dehydration obtained varies with the thickness of the filter cake. In operation, variations in the filter cake composition frequently are unavoidable. Moreover, as the operation progresses, the filter gradually becomes partially clogged, which results in differences in the filter cake thickness and the perviousness of the cake. It is desirable that, in processing a product to be dehydrated, the degree of dehydration remain essentially constant for hours and even days since otherwise breakdown or trouble might occur in subsequent operating stations in which the dehydrated product is processed further.

As an overall object, the present invention seeks to provide substantially uniform operation of a filter of the type described above, even under varying compositions of the substances to be dehydrated and under other conditions which affect the thickness of the filter cake. In this respect, the invention resides in the discovery that the efficiency of the filter is dependent on the difference between the temperature above the filter cake and the temperature within the interior of the filter drum itself.

The aforementioned object is accomplished in accordance wtih the invention by controlling the amount and/or temperature of the admitted steam in response to the difference between the temperature above the filter cake and the temperature within the filter drum. While operation of the invention depends upon the difference in temperature above the filter cake and that within the filter drum, it has been found that the process can be controlled by measuring the temperature within the drum only. In such a case, the temperature of the steam above the filter cake is assumed to be at a certain value. Alternatively, temperature sensing elements can be above the filter cake and within the drum, respectively, and these two signals compared to derive an output signal which controls the amount and/or temperature of the steam supplied to the apparatus.

The above and other objects and features of the invention will become apparent from the following detailed description taken in connection with the accompanying drawings which form a part of this specification, and in which:

FIGURE 1 is a cross-sectional view taken vertically through the axis of the filter drum, and incorporating one embodiment of the steam temperature control apparatus of the invention wherein temperature measuring devices are employed above the filter cake and within the filter drum, respectively; and FIG. 2 is a schematic illustration of a regulating and control device in accordance with the invention and employing temperature measuring devices within the filter drum alone.

With reference now to the drawings, and particularly to FIG. 1, the filter mud or sludge 11 consisting of a suspension of coal mud, is contained within a container 10a of drum filter apparatus, the drum 10 being rotatable about a shaft 10b. The drum 10 is of cylindrical configuration, the outer cylindrical peripheral wall 10c having a plurality of openings or pores therein and constituting the actual filter element. Within the drum there exists an underpressure of, for example, 0.5 atmosphere, the underpressure being produced by the creation of a vacuum in shaft 10b by means of a pump or the like, not shown. As the drum 10 rotates in the direction of arrow 12, a filter cake 13 is formed on the peripheral wall 10c. The filter cake 13, shortly after entry into an arcuate steam hood 14, is subjected to steam admitted through conduit 15. The limit of the steam action zone is indicated by the broken line 16.

Thus, as the drum 10 rotates in the direction of arrow 12, the vacuum within the drum causes the filter cake 13 to adhere to the outer peripheral wall 10c. Water is drained from this filter cake 13 by virtue of the partial vacuum within the interior of the drum 10 while rotational motion of the drum is in progress. The filter cake 13 may be separated from the drum at the other side thereof by means of a scraper 10d or the like.

The steam hood 14 is arranged above the drum 10 such that the distance thereof from the vessel 10a is somewhat greater at the right side as shown in FIG. 1, at which the drum with the filter cake 13 thereon emerges, than at the left side at which the layer is scraped off by scraper 10d. Moreover, the inlet 15 for the steam is arranged in an off-center position. That is, it is shifted with respect to a vertical line extending through the center of the shaft 10b a certain distance in the direction of drum rotation. In operation, a preliminarily dewatering zone covering an arc between the surface of the mud 11 within vessel 10a and the right end of the steam zone 16 is formed where the mud is preliminarily dewatered under the influence of the vacuum only. After preliminarily dewatering between the surface of the mud 11 in vessel 10a and the right edge of the steam zone 16, the cake 13 is introduced into the steam action zone 16 for further removal of water.

Reference numerals 17 and 18 indicate resistance thermometers disposed within the filter drum 10 and above the filter cake 13, respectively. The temperature indicated by the thermometers 17 may be designated as $T_2$; while the temperature measured by the thermometers 18 is designated as $T_1$. The difference in temperatures $T_1-T_2$ is a measure of the dehydration effect of the filter drum.

For a filter cake scraped off the drum and having a water content of 12 to 13%, the temperature $T_1$ in an actual case was found to be between 120 and 135° C., and the temperature $T_2$ was between 32 and 35° C. In this specific example, the filter cake had a content of 35% fine grains having an average diameter of less than 0.1 millimeter. The thickness of the filter cake varied between 18 and 25 millimeters.

With an increase in the fine grain content or in the filter cake thickness (i.e., with a decrease in the pore diameter and hence, a decrease in the perviousness), the temperature within the filter drum without the control arrangement of the invention was found to be between 20 and 25° C. while the steam temperature and the steam amount were the same as before. That is, the inlet steam temperature remained between 120 and 135° C. In this case, the water content in the filter cake rose between 16 and 17%.

It was found, however, that by increasing the steam temperature to the range of 150 to 160° C., and by also increasing the amount of steam, one could raise the temperature within the filter drum to the range of 30 to 35°, whereby the water content in the filter cake again was reduced to between 12 and 13%.

From the foregoing, it will be appreciated that the temperature of the atmosphere within the filter drum 10 is an indication of the water content in the filter cake. Accordingly, the system may be controlled by measuring the temperature within the filter drum 10 alone or, alternatively, within the drum 10 and above the filter cake 13. Such a system is shown in FIG. 2 and includes three resistance thermometers 17 connected through leads 17a to three temperature indicators 17b which may be used for monitoring purposes, if desired. The three signals from the resistance thermometers 17 are combined and applied to a control mechanism 19 which, through mechanical linkages 19a and 19b controls valves 20 and 23, respectively. Valve 20 controls the flow of steam through the main steam supply line 21; whereas valve 23 controls the flow of cooling water through conduit 24. This cooling water, in turn, flows through a cooler 25 for the steam flowing through conduit 21. With the arrangement shown, it will be appreciated that as the valve 20 is opened to a greater extent, more steam flows into the hood 14; whereas an increase in cooling water through the cooler 25 by virtue of valve 23 being open decreases the amount and temperature of the steam. As shown, the main steam conduit 21 is connected to four separate inlets beneath hood 14 through separately adjustable valves 22. Numeral 26 identifies a steam flow meter connected in shunt with a portion of the main steam supply line 21.

In operation, as the temperature of the steam measured by the resistance thermometers 17 decreases, the control mechanism 19 will adjust the valves 20 and 23 such that the steam temperature above the filter cake 13 increases. Conversely, if the temperature sensed by thermometers 17 should increase, the reverse action occurs.

As mentioned above, the system can be controlled by determining the temperature differential above the filter cake 13 and within the drum 10. In this latter case, three resistance-type thermometers 18 above the filter cake 13 will be connected through lead 27 to the control mechanism 19 where the signals from thermometers 18 and those from thermometers 17 are compared to effect control of the valves 20 and 23.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

The method of making a dewatered coal-slurry product having about 12 percent of water by weight from a bath of coal sludge containing about 30 to 35 percent of water by weight, a product of said low water content being made consistently regardless of variations in the proportion of finely divided material present from time to time in said sludge and of variations in the thickness of the filter cake, said method comprising contacting said bath of sludge with a rotating pervious member of a vacuum filter apparatus so as to cause the formation of a filter cake on said member, partially dewatering said filter cake further immediately after its emergence from said bath for a period of about the time that it takes for said rotating, pervious member to rotate through about one-third of the arc corresponding to the part of said rotating, pervious member that lies outside said bath, and then continuing to dewater said filter cake while further rotating said pervious member and simultaneously subjecting said filter cake to the action of superheated steam at a pressure of about 1.2 to 1.5 atmospheres with a steam consumption of about 14 to 20 kilograms per metric ton of said product, said product being heated as a result of treatment with said steam to a temperature of about 40 to 50° C., changes in the thickness of said filter cake as a result of changes in the efficiency of the filtering operation and the proportion af finely divided material in said sludge being compensated for and controlled by monitoring the temperature of steam that has passed through said filter cake and whenever said monitored temperature departs from the range of about 32 to 35° C., adjusting at least one of the steam flow rate and the steam supply temperature so as to maintain the temperature so monitored at about 32 to 35° C., and removing said product from said rotating pervious member of said vacuum filter apparatus.

References Cited

UNITED STATES PATENTS

| | | | |
|---|---|---|---|
| 1,336,444 | 4/1920 | Salisbury | 210—68 |
| 2,500,056 | 3/1950 | Barr | 210—402 X |
| 3,245,538 | 4/1966 | Leonard | 210—184 X |
| 3,268,078 | 8/1966 | Muggli | 210—179 |

SAMIH N. ZAHARNA, *Primary Examiner.*